(12) United States Patent
Wiedenman et al.

(10) Patent No.: US 7,051,131 B1
(45) Date of Patent: May 23, 2006

(54) METHOD AND APPARATUS FOR RECORDING AND MONITORING BUS ACTIVITY IN A MULTI-PROCESSOR ENVIRONMENT

(75) Inventors: Gregory B. Wiedenman, Woodbury, MN (US); Nathan A. Eckel, Fridley, MN (US); Mary C. Roskowiak, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 348 days.

(21) Appl. No.: 10/330,829

(22) Filed: Dec. 27, 2002

(51) Int. Cl.
*G06F 13/00* (2006.01)

(52) U.S. Cl. .................. 710/107; 710/105; 710/18
(58) Field of Classification Search .......... 710/105, 710/107, 18
See application file for complete search history.

(56) References Cited

U.S. PATENT DOCUMENTS

| | | | | |
|---|---|---|---|---|
| 4,007,449 A | * | 2/1977 | Vercesi | 710/58 |
| 4,484,269 A | * | 11/1984 | Crain | 702/186 |
| 4,485,440 A | * | 11/1984 | Duff et al. | 713/600 |
| 4,590,550 A | * | 5/1986 | Eilert et al. | 714/45 |
| 4,872,121 A | * | 10/1989 | Chan et al. | 702/182 |
| 4,949,252 A | * | 8/1990 | Hauge | 714/46 |
| 5,014,218 A | * | 5/1991 | Crain et al. | 700/9 |
| 5,193,179 A | * | 3/1993 | Laprade et al. | 714/47 |
| 5,206,948 A | * | 4/1993 | De Angelis et al. | 714/45 |
| 5,402,431 A | * | 3/1995 | Saadeh et al. | 714/47 |
| 5,426,741 A | * | 6/1995 | Butts et al. | 710/18 |
| 5,663,948 A | * | 9/1997 | Kobunaya | 370/229 |
| 5,729,678 A | * | 3/1998 | Hunt et al. | 714/43 |
| 5,862,371 A | * | 1/1999 | Levine et al. | 712/228 |
| 5,905,738 A | * | 5/1999 | Whetsel | 714/732 |
| 6,122,693 A | * | 9/2000 | Gutta et al. | 710/107 |
| 6,629,170 B1 | * | 9/2003 | Davidson et al. | 710/100 |

* cited by examiner

*Primary Examiner*—Rehana Perveen
*Assistant Examiner*—Justin King
(74) *Attorney, Agent, or Firm*—Charles A. Johnson; Mark T. Starr; Crawford Maunu PLLC

(57) ABSTRACT

A method and apparatus to facilitate a history trace of system bus activity in a Symmetric Multi-Processor (SMP) environment. A dynamic scan capability is provided to User (516) via Computer (504) that allows dynamic configuration of History Control Register (518), thus providing a maskable history stack of system bus activity to be obtained from History Memory (508) for subsequent analysis.

25 Claims, 7 Drawing Sheets

METHOD AND APPARATUS FOR RECORDING AND MONITORING BUS ACTIVITY IN A MULTI-PROCESSOR ENVIRONMENT

FIELD OF THE INVENTION

The present invention relates generally to history stacks, and more particularly, to dynamically configured history stacks that may be triggered on configurable control modes to save configurable data formats.

BACKGROUND OF THE INVENTION

Today's computing architectures are designed to provide the sophisticated computer user with increased Reliability, Availability, and Scalability (RAS). To that end, the rise of the Microsoft Windows NT/2000 operating environment has presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows the Windows NT/2000 based servers to perform in such mission critical solutions. The CMP architecture incorporates high performance Intel processors using special hardware and middleware components that build on standard interface components to expand the capabilities of the Microsoft Windows server operating systems. The CMP architecture utilizes a Symmetric MultiProcessor (SMP) design, which employs multiple processors supported by high throughput memory, Input/Output (IO) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold and may consist at least of the following: 1) to provide scaling of applications beyond what is normally possible when running Microsoft Windows server operating systems on an SMP system; 2) to improve the performance, reliability and manageability of a multiple application node by consolidating them on a single, multi-partition system; 3) to establish new levels of RAS for open servers in support of mission critical applications; and 4) to provide new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is going to be the same. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence. As each processor maintains its own copy of system level memory within its cache, subsequent data writes cause the memory in each cache to diverge.

A common method of solving the problem of memory coherence in SMP dedicated cache systems is through bus snooping. A processor monitors the address bus for memory addresses placed on it by other processors. If the memory address corresponds to an address whose contents were previously cached by any other processor, then the cache contents relating to that address are marked as a cache fault for all processors on the next read of that address, subsequently forcing a read of system memory. One major difficulty, however, in a multi-processor environment, is overloading the memory bus through the use of bus snooping, which results in a scalability limitation.

Another problem that exists within SMP designs is the lack of visibility to the system bus that is shared by each processor. Often, problems arise in the operation of the SMP, which may generally point to a problem with the system bus and/or the signals on the system bus. Lack of further visibility into the bus specifics, such as address dependent, data dependent, or function dependent system bus errors tend to complicate the trouble shooting process of the system bus errors.

Another problem that exists within SMP designs is that when history data is provided, no maskable operation is allowed which provides a user with the ability to dynamically select various trace modes and trace data formats to suit his particular needs.

A need exists, therefore, to provide a mechanism that allows a trace of system bus transactions to be stored for later retrieval and troubleshooting. Further, a need exists which allows a customization of the system bus trace such that error dependencies based on address, data or function may be easily determined.

SUMMARY OF THE INVENTION

The present invention is directed to a maskable history stack allowing a user to configure a dynamic scan register via a computer to set a capture mode of interest, a data format used to store the captured data of interest, and a triggering event used to commence and cease history tracking activity.

In accordance with one embodiment of the invention, a method of providing a maskable history stack is provided. The method comprises configuring a dynamic scan register to define a capture mode, configuring the dynamic scan register to define a data format, collecting bus activity in response to a triggered event based on the capture mode, and storing data representative of the bus activity in accordance with the data format.

In accordance with another embodiment of the invention, a maskable history trace apparatus is presented. The maskable history trace apparatus comprises a bus interface, a history control register coupled to the bus interface, and a history memory coupled to the history control register, wherein the history control register is dynamically configured to mask bus activity on the bus interface such that data stored in the history memory is defined by the history control register.

In accordance with another embodiment of the invention, a multiprocessing system is presented. The multiprocessing system comprises a plurality of multiprocessors sharing a common system bus and a node controller coupled to each of the plurality of multiprocessors. The node controller comprises a bus interface controller coupled to the common system bus. The node controller further comprises a maskable history trace apparatus comprising a history control register coupled to the common system bus, and a history memory coupled to the history control register, wherein the history control register is dynamically configured to mask bus activity on the common system bus such that data stored in the history memory is defined by the history control register The above summary of the present invention is not intended to describe each illustrated embodiment or implementation of the present invention. This is the purpose of the figures and the associated discussion which follows.

DETAILED DESCRIPTION

Figure 1:
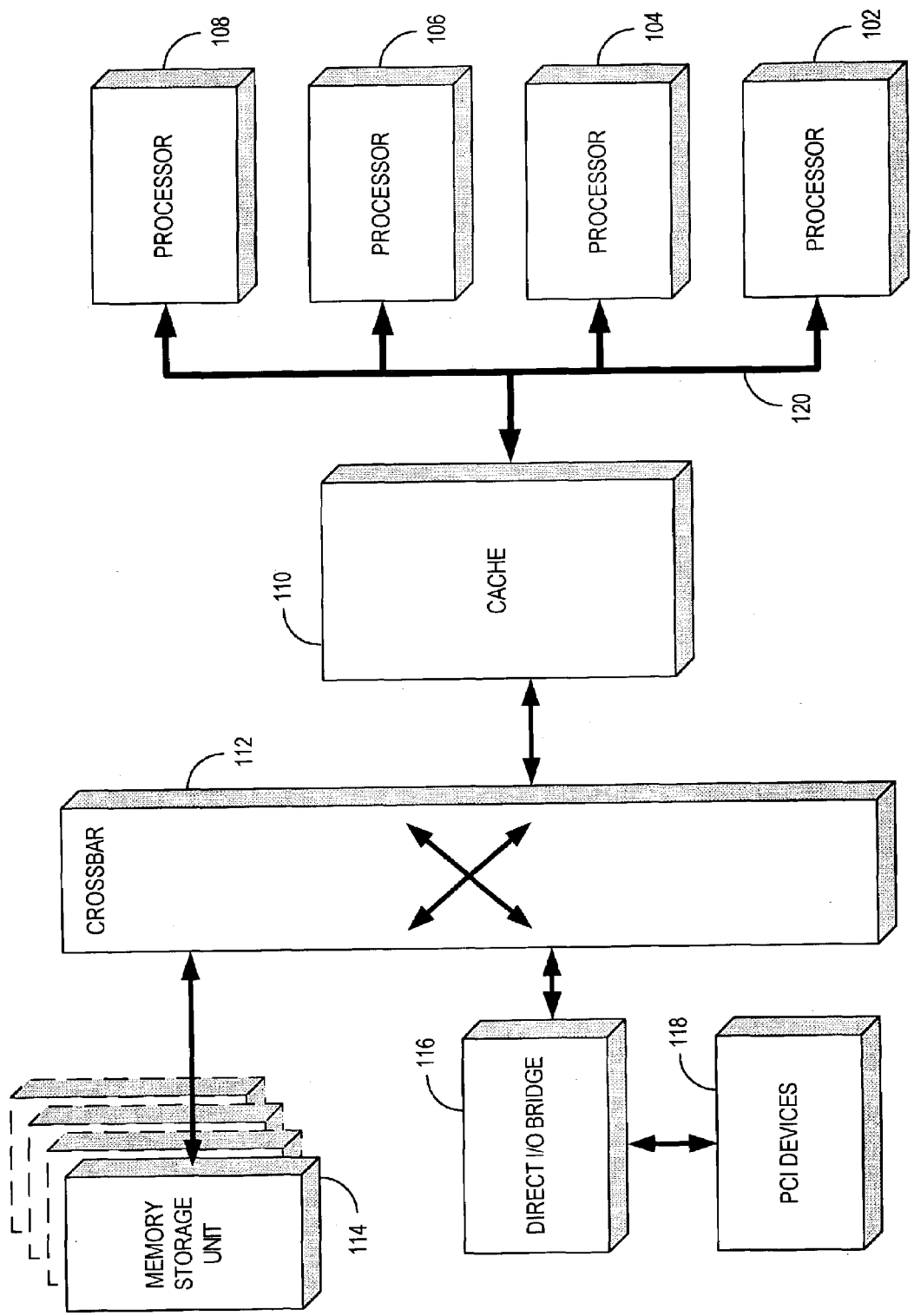
FIG. 1 illustrates a block diagram of a processing cell in accordance with the present invention.

FIG. 1 illustrates an exemplary block diagram of a processing cell in accordance with the present invention. A typical processing cell, or sub-pod, is comprised of multiple Central Processing Units 102–108 and a corresponding Cache 110. The processing units may be of the 128 bit McKinley processor family as produced by Intel Corp., the 64-bit, IA-64 Itanium family, also produced by Intel Corp., or may, for example, be of the 32-bit, Xeon processing family, also produced by Intel Corp. Each of processors 102–108 share Cache 110 through bus 120, where bus 120 may serve up to, for example, four processors 102–108. Memory Storage Units 114 provides a shared memory pool for processors 102–108 through non-blocking cross-bar 112. Direct IO Bridge 116 provides high-throughput access to Peripheral Component Interconnect devices 118. It should be noted that the present invention is not limited for use with only those processors listed above, but may be used with any processor that is compatible within a multi-processing environment.

Memory Storage Unit 114 may consist of up to four main memory banks each of which may contain a maximum of 16 GigaBytes of Random Access Memory. Likewise, Cache 110 may comprise up to four banks of cache (not shown), each cache bank may contain up to 32 MegaByte of RAM, which is on the order of five times faster than Memory Storage Unit 114 RAM. Each cache bank has a dedicated, direct connection to each of Memory Storage Units 114, each direct connection being supported by crossbar 112. Memory Storage Unit 114 has a typical mainframe design, such that each Memory Storage Unit 114 may handle hundreds of access requests concurrently. Even higher performance may be realized by allowing interleaving between each Memory Storage Unit 114. When interleaving is enabled, data may be spread across all Memory Storage Units 114 and may be accessed in parallel by any one of processors 102–108 and/or cache 110. Crossbar 112 allows for fast, consistently low latency, high bandwidth transmissions between cache 110 and IO bridge 116.

Multiple sub-pods, like the sub-pod illustrated in FIG. 1, may be combined to provide a highly scalable solution for today's demanding enterprise environments in accordance with the present invention. A single configuration of multiple sub-pods, for example, may include a total of 32 processors, along with eight cache modules, 64 GB of main memory, four cross-bars and eight direct I/O bridges to support a total of 96 PCI slots.

Figure 2:
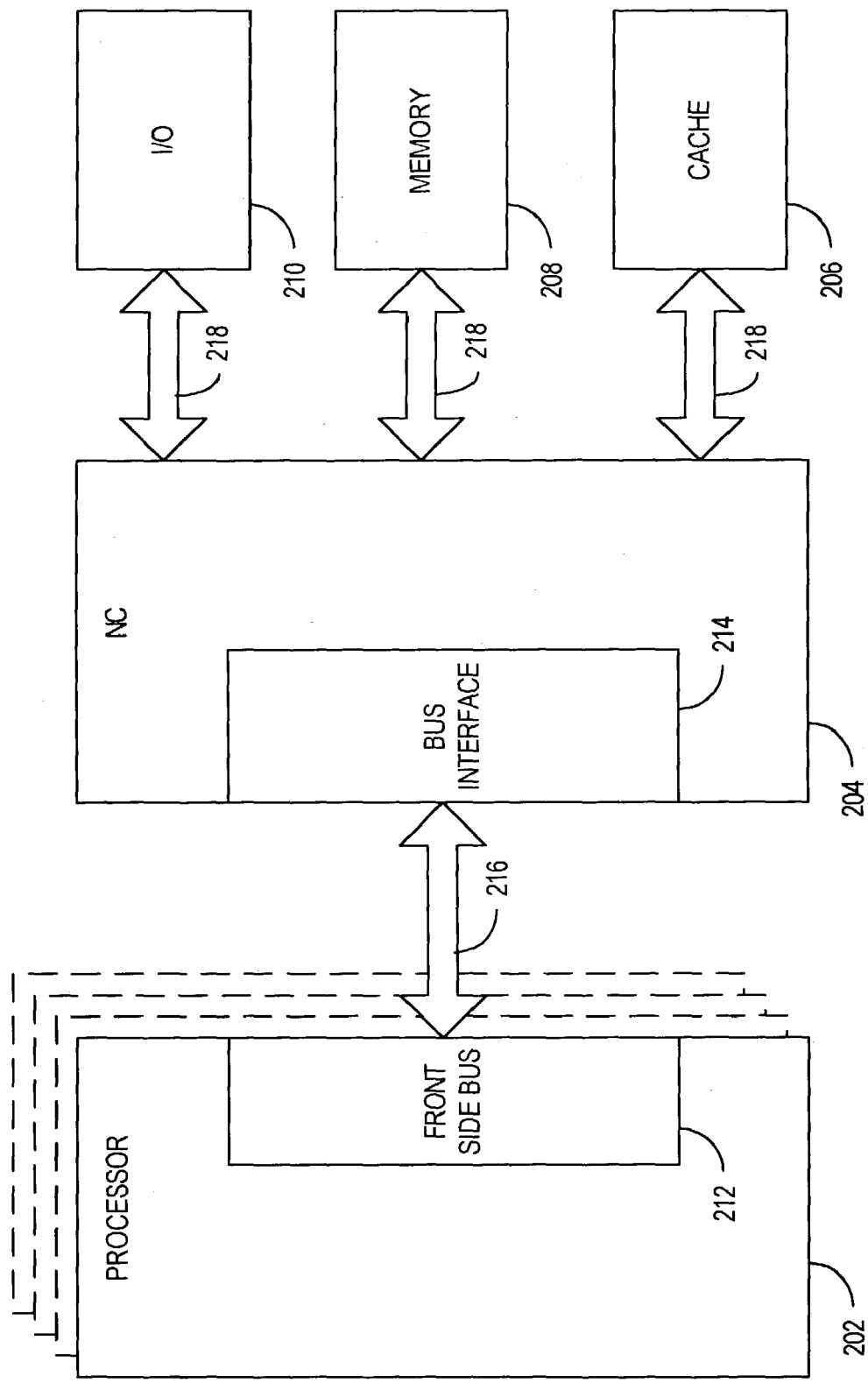
FIG. 2 illustrates a block diagram of the bus interaction of the processing cell of FIG. 1.

FIG. 2 illustrates an exemplary block diagram illustrating bus components within processors 102–108 and the associated bus controller required to negotiate bus access by processors 102–108 to I/O 210, Memory 208, and Cache 206. Processors 202 each contain Front Side Bus (FSB) 212. Node Controller (NC) 204 provides the processor system Bus Interface 214 and cache controller chip for up to four processors 202 operating on common system bus 216. NC 204 resides on the sub-pod module and is the central agent on the processor system bus to allow interactions between processors 202, cache 206, MSU 208, and I/O 210.

NC 204 facilitates access to cache 206 providing quick access to commonly used cache lines that are requested on system bus 216. The data portion of cache 206 resides in Static RAM (SRAM) that is external to NC 204 and a corresponding on-chip tag RAM keeps track of state and control information for the resident cache lines. In operation, copies of frequently accessed state and control information, called cache blocks or cache lines, are maintained in the SRAM portion of cache 206. Each cache block or line is marked with a block address, referred to as a tag, so that cache 206 knows to which part of the SRAM memory space the cache line belongs. The collection of cache tags for each memory block contained within the SRAM is contained within the on-chip tag RAM. For example, if cache line $B_j$ containing data entries $D_j$ is assigned to a portion of SRAM called $M_l$, then $B_j$ is in the on-chip tag RAM and $D_j$ is contained within the SRAM of cache 206. Cache 206 is a non-inclusive cache, meaning that not all cache lines resident in the processor's cache are necessarily resident cache 206.

In operation, Node Controller 204 decodes Front Side Bus 212 transactions on system bus 216 into two main types: 1.) coherent memory requests; and 2.) non-coherent requests. Coherent memory requests are controlled under the MESI protocol throughout the system and cache 206. Memory within a multiprocessor system in which every memory read and every memory write is instantly known by each processor within the system is known as coherent memory. Coherent memory requests, therefore, must communicate the memory accessed by one processor to the other processors on the bus through the use of a bus snooping function, so that stale data is not used. Coherent memory requests on system bus 216 are monitored by the bus snooping function and communicated to all processors 202 on bus 216. The non-coherent requests, on the other hand, correspond to requests such as memory-mapped I/O, interrupts, and other special transactions which do not use cache 206.

Communication between NC 204, I/O 210, memory 208 and cache 206 is conducted via interface 218, which is implemented using a crossbar similar to the crossbar discussed in relation to FIG. 1. The crossbar is a multi-input, multi-output, non-blocking electronic switch, where access from NC 204 and external components is unimpeded, thus removing any potential bottlenecks. The number of processors 202 operating in conjunction with NC 204 is advantageously limited in order to avoid excessive bus contention on system bus 216, especially in consideration of the bus snooping function as discussed above.

Data transfer on bus 216 may be implemented on varying width buses to include 32, 64 and 128 bit buses and beyond. The clocking rate on bus 216 is usually in the range of several hundred MegaHertz (MHz) and data may be transferred on both the rising and falling edges for double-pumped operation of the system bus clock to achieve an effective system bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 202 are responsible for obeying any bus specification that may exist for bus 216 between Front Side Bus 212 and Bus Interface 214.

Bus Interface 214 interfaces Node Controller 204 to Front Side Bus 212 for each of processors 202. Bus Interface 214 provides at least the following functions: 1.) a request queue that allows NC 204 or processors 202 to generate bus requests; 2.) an in-order queue to receive bus requests from processors 202; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
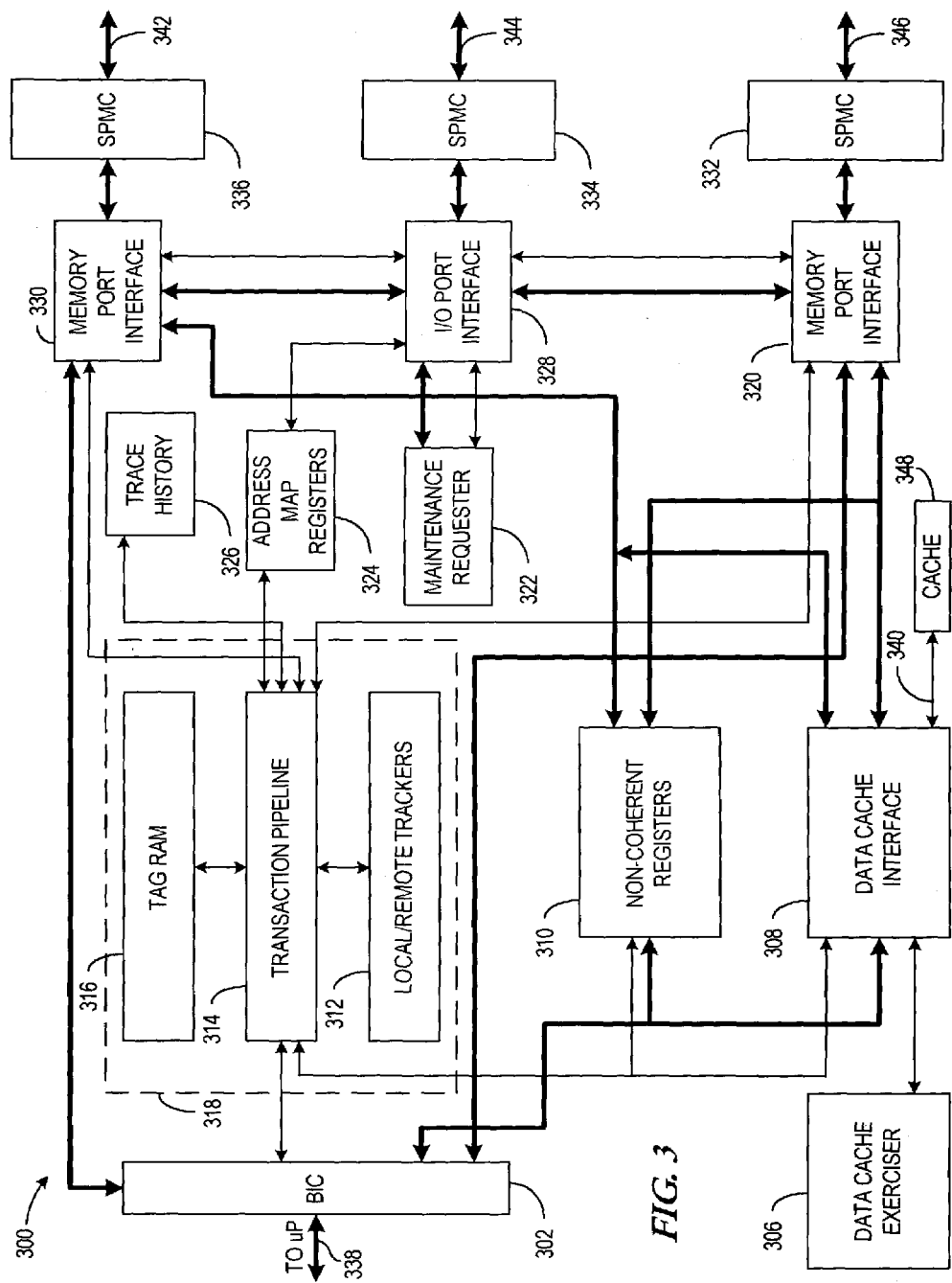
FIG. 3 illustrates a block diagram of a node controller in accordance with the present invention.

FIG. 3 illustrates an exemplary block diagram of Node Controller 300 in accordance with the principles of the present invention and is interconnected as follows. Bus Interface Controller 302 connects to system bus 338, which is the system bus for the processors attached to the particular sub-pod of interest. Bus Interface Controller 302 interconnects through a data bus to Memory Port Interfaces 320 and 330 as well as to Data Cache Interface 308. Transaction Processor 318 is comprised of Tag RAM 316, Transaction Pipeline (TP) 314 and Local/Remote Trackers 312. Tag RAM 316, Transaction Pipeline 314 and Local/Remote Trackers 312 are each interconnected through a control bus and Transaction Pipeline 314 is interconnected to Bus Interface Controller 302 through a control bus. Transaction Pipeline 314 also provides control through a control bus to Address Map Registers 324, Trace History 326, Memory Port Interfaces 330 and 320. A data bus interconnects Bus Interface Controller 302 and Non-Coherent Registers 310 and Data Cache Interface 308. A data bus also interconnects Non-Coherent Registers 310 and Data Cache Interface 308 to Memory Port Interfaces 320 and 330. Data Cache Interface 308 is interconnected to cache 348 that may be separately located, e.g. off-chip, from Data Cache Interface 308. Maintenance Requestor 322 and I/O Port Interface 328 are interconnected by both a data bus and a control bus. A control bus interconnects Address Map Registers 324 to I/O Port Interface 328. Data and control bus interfaces exist between I/O Port Interface 328 and Memory Port Interfaces 320 and 330. Scalability Port Memory Controllers 332, 334, and 336 interconnect through a data bus to Memory Port Interface 320, I/O Port Interface 328, and Memory Port Interface 330, respectively. Data buses 342 and 346 interconnect Scalability Port Memory Controllers 336 and 332, respectively, to the respective Memory Storage Unit associated with the particular sub-pod assembly. It should be noted that dual data buses 342 and 346 are provided to Node Controller 204 to allow for fault tolerant functionality, parallel processing, etc. Scalability Port Memory Controllers 344 transfer data between I/O Port Interface 328 and PCI devices 118 as depicted in FIG. 1 and I/O devices 210 as depicted in FIG. 2.

In operation, Node Controller 300 provides all the necessary functions required to facilitate processor bus operations on bus interface 338. In particular, Node Controller 300 facilitates at least seven primary functions: 1.) Out-Going Queue for outgoing requests to be sent out to Bus Interface Controller 302; 2.) In-Order Queue for incoming requests from Bus Interface Controller 302; 3.) Response Control for all bus requests; 4.) Datapath for data transfer and control between Memory Storage Units; 5.) I/O interface module to facilitate access to PCI devices; 6.) History Stack for Bus Interface Controller 302 history capture; and 7.) Error Checking to collect and check all errors. The other major interfaces accommodated by Node Controller 300 include the Bus Interface Controller 302 to Transaction Pipeline 314 interface which handles control signals and address/function signals, data transfers between Bus Interface Controller 302 and Data Cache Interface 308, data transfers between Bus Interface Controller 302 and Memory Storage Unit 0 (not shown) on interface 342, data transfers between Bus Interface Controller 302 and Memory Storage Unit 1 on interface 346, and non-coherent data transfers between Bus Interface Controller 302 and Non-Coherent Registers 310.

The Out-Going Queue function receives requests to be sent to Bus Interface Controller 302 from either Transaction Pipeline 314, Memory Port Interface 330, or Memory Port Interface 320. The requests are individually strobed into a priority selection block which acknowledges and grants execution of the request according to a prioritized selection algorithm, or held for later processing within the Out-Going Request Queue. Each of the requesting entities places information concerning the request type, which may be represented by a 3–5 bit digital code identifying one of a number of possible request types. Likewise, an In-Order Queue is utilized to store requests received from the processor on Bus Interface Controller 302 pertaining to, for example, snoop requests or write transactions sent from the processor.

The request signals comprise, for example, an active low address field used to identify the recipient of the request as well as a parity field to maintain an even number of active low signals on the address bus. Likewise, the request field is maintained with even parity by an associated request parity bit. The lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received and provide status for the requests that have been received. Each response signal comprises a response status field, whose parity is held even by a response parity field. Additionally, a Target Ready bit is maintained within the response signal to allow the receiving party to signal its readiness for write data or writeback data, if a data write is appropriate for the particular request. For transactions with an implicit writeback, the Target Ready bit is asserted twice, first for the write data transfer and second for the implicit writeback data transfer.

Data response signals control the transfers of data on bus interface 338. The agent responsible for transferring data on the data bus is responsible for indicating that data on the bus is valid and that the data should be latched. The data bus agent, for example, should assert a ready bit at both the rising edge and falling edge of the bus clock for double-pumped operation. Additionally, the ready bit may be deasserted by the transmitting entity in order to insert wait states into the data phase. Bus interface 338 may represent, for example, a 32, 64, or 128 bit width and may be enabled for individual bytes within bus 338. For example, if bus interface 338 is 64 bits wide, then the bus is capable of transferring 8 bytes of data at a time, where each byte equals 8 bits. A 3-bit byte enable field, for example, could then be used to provide information as to which bytes of data are valid on the 64-bit bus. Additionally, the data transferred on bus 338 may be Error Correction Coded regardless of which bytes are enabled.

Figure 4:
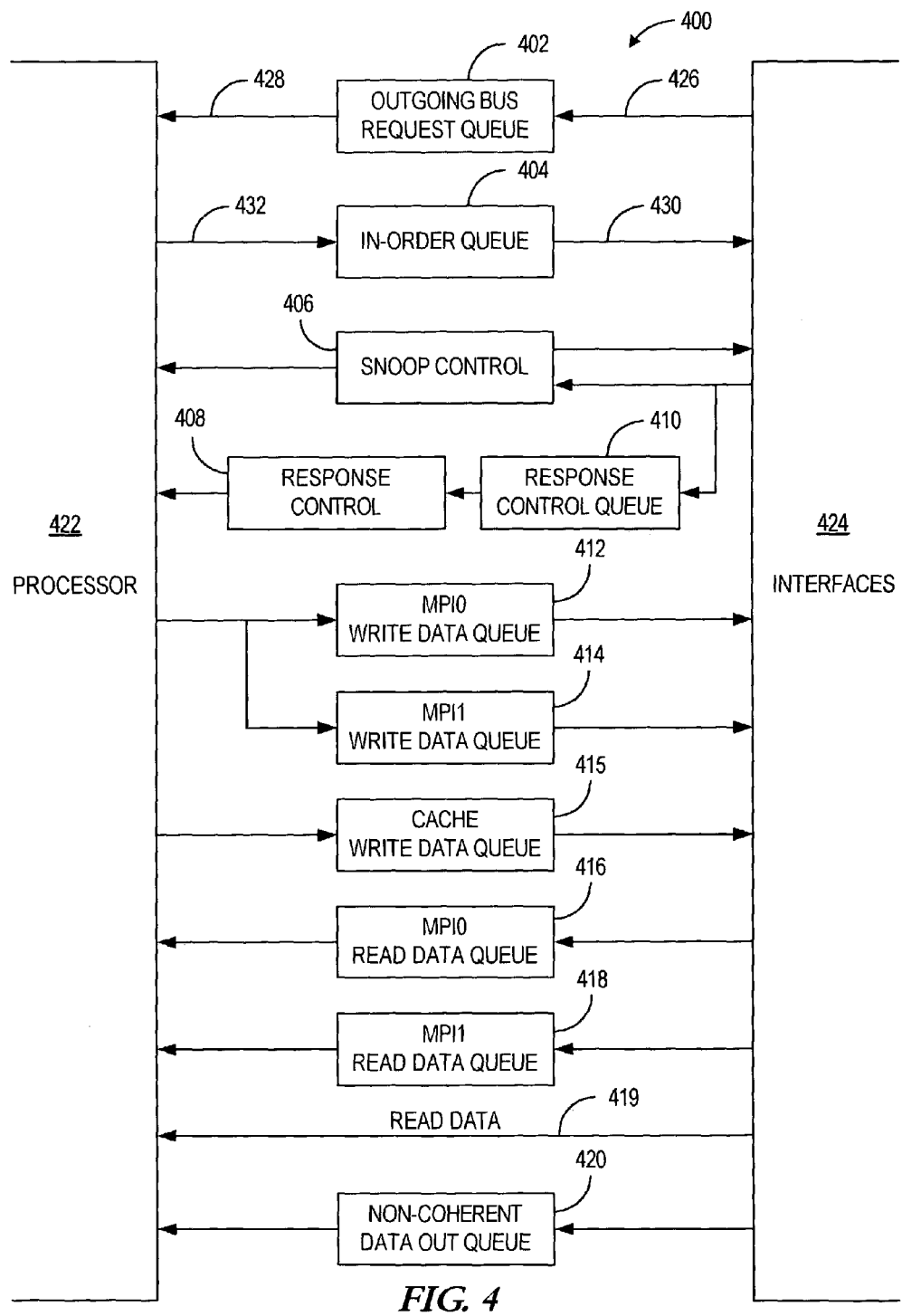
FIG. 4 illustrates a functional block diagram of the bus interface controller of FIG. 3.

FIG. 4 illustrates an exemplary functional block diagram 400 of Bus Interface Controller 302 as illustrated in FIG. 3. Processor 422 may represent one of many processors adapted to contemporaneously interface with other modules/interfaces 424 of the system, such as to the memory interface, cache interface, pipeline, etc. Generally speaking, there exist five phases of operation of Bus Interface Controller 302: 1.) Arbitration; 2.) Request; 3.) Snoop; 4.) Response; and 5.) Data. Arbitration phase operation of Bus Interface Controller 302 allows for one of Processors 422 to obtain control of Bus Interface 338, or alternatively to allow other interfaces 424 to obtain control of Bus Interface 338, during one or more bus clock cycles. Arbitration phase is entered when one of Processors 422 asserts a bus request signal or another interface 424 asserts the bus request signal. A number of agents may simultaneously arbitrate for the request bus, where Processors 422 represent symmetric agents and the other interfaces 424 represent priority agents. Owning the bus is a necessary pre-condition for initiating a transaction. The symmetric agents arbitrate for the bus based on a round-robin rotating priority scheme. Priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of Bus Interface Controller 302 is entered when either Processors 422 or interface 424 modules have successfully arbitrated for bus control. With reference to both FIGS. 3 and 4, request signals may be provided by Transaction Pipeline 314, Memory Port Interface 330, and Memory Port interface 320 via interfaces 424, and bus request signals may be provided by Processor 422 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. Even parity is used to insure that an even number of active low signals exist throughout the entire request signal.

Outgoing Bus Request Queue 402 receives bus requests from one or more modules/interfaces 424 via interface 426 and provides the requests via Interface 428 to the addressed Processor 422 of the request. Likewise, In-Order Queue 404 receives bus requests from Processor 422 via interface 432 and provides the bus requests to the addressed recipient via bus 430. Each of Outgoing Bus Request Queue and In-Order Queue is limited, for example, to a depth of 8 and are responsible for queuing up requests from interfaces 424 and Processor 422, respectively. Handshake signals are used between Outgoing Bus Request Queue 402 and modules/interfaces 424 and also between In-Order Queue 404 and Processor 422 in order to throttle the number of requests received by each of Queues 402 and 404. Additional signaling is provided by Outgoing Bus Request Queue 402 when the queue has been filled to a predetermined depth. If, for example, the predetermined depth is 5 and the overall queue depth is 8, then 3 extra slots are provided in Outgoing Bus Request Queue 402 to allow for potential requests that may be waiting in Transaction Pipeline of FIG. 3. Each of Processors 422 monitors the In-Order Queue 404 and will stop sending requests when the queue is full.

Snoop phase operation is controlled through the combined operation of In-Order Queue 404 and Snoop Control 406 and is required to maintain cache coherency. With regard to FIGS. 2 and 3, Memory Port Interfaces 330 and 320 provide write and read access to, for example, Memory 208. Memory reads are cached into Cache 348 by Data Cache Interface 308, whereby subsequent access to the same memory space results in a memory read from Cache 348 instead of a memory read from Memory 208, resulting in a shorter memory access time. Memory 208, however, represents shared memory space to each Processor 422. Data read from Memory 208 and subsequently cached during one clock cycle from a first Processor 422 may be invalidated by a subsequent write to the same address in Memory 208 by a second Processor 422.

Snoop Control 406 is, therefore, used to provide snoop control of Cache 348 to Processors 422, while In-Order Queue 404 receives snoop requests from Processors 422. In operation, snoop signals from Snoop Control 406 allow Processors 422 to determine whether: 1.) an unmodified, requested cache line exists within Cache 348, resulting in a cache hit; 2.) a modified, requested cache line exists within Cache 348, resulting in a cache hit to a modified cache line; or 3.) no cache line exists within Cache 348, resulting in a cache miss. The snoop signals from Snoop Control 406 are used to maintain cache coherency at the system level and, therefore, provide an indication that the on-chip cache line within the snooping agent, e.g., Processor 422, is valid or invalid, whether the Cache 348 line is in a modified, or dirty, state or whether the transaction should be extended until such time that a valid snooping state may be determined.

The response phase of Bus Interface Controller 302 is controlled by Response Control Queue 410 and Response Control 408 and are responsive to requests received by In-Order Queue 404. A responding agent within the modules/interfaces 424 is responsible for processing requests at the top of In-Order Queue 404, where the responding agent is the agent being addressed by the request, e.g., Memory Port Interface 330 during a memory read of Memory 208 of FIG. 2 or alternately a memory read of Cache 348, if cached memory is present. Each response contains a response identifier, which is used to provide a response code to be placed on Bus Interface 338 during the response phase of Bus Interface Controller 302. The response code identifies, for example, a result of a bus snoop initiated by one of Processors 422. The results of the bus snoop may indicate, for example, that normal data was found, that no data was found, that the request is to be deferred, or that the request is to be retried. It should be noted that if the response code indicates that either a retry or deferral is necessary and that Snoop Control 406 indicates that Cache 348 is in a modified state, then the retry or defer response code will be implicitly changed to an automatic writeback from Memory 208 of FIG. 2, where Cache 348 will provide itself as a target to maintain data coherency between Cache 348 and Memory 208.

The data phase of Bus Interface Controller 302 operates to transfer data between Memory Port Interface 320 and related Memory Port Interface 0 Write Data Queue 412 and Memory Port Interface 0 Read Data Queue 416 and between Memory Port Interface 330 and related Memory Port Interface 1 Write Data Queue 414 and Memory Port Interface 1 Read Data Queue 418. Cache data may also be transferred from the Processor 422 to cache via the Cache Write Data Queue 415, and to the Processor as shown on path 419. Non-coherent Data Out Queue 420 operates to transfer data contained from local registers within interfaces 424 to Processors 422. A byte enable field may be used to enable multiple data bytes on the data bus per transfer cycle.

Bus transactions on bus interface 338 of FIG. 3 occur at a rate that is on the order of several GigaBytes per Second and are generally characterized as being of the arbitration, request, snoop, response and data phase types. Trace History 326 of FIG. 3 represents an important feature according to the principles of the present invention that facilitates a trace history of system bus transactions on bus interface 338. Trace History 326 may be operated in one of two modes: data capture mode or data read mode. In data capture mode, data is captured and stored, i.e., recorded, according to a predetermined trace configuration. In data read mode, data that was previously recorded is retrieved from Trace History RAM using a dynamic scan and made available for retrieval via maintenance software.

Figure 5:
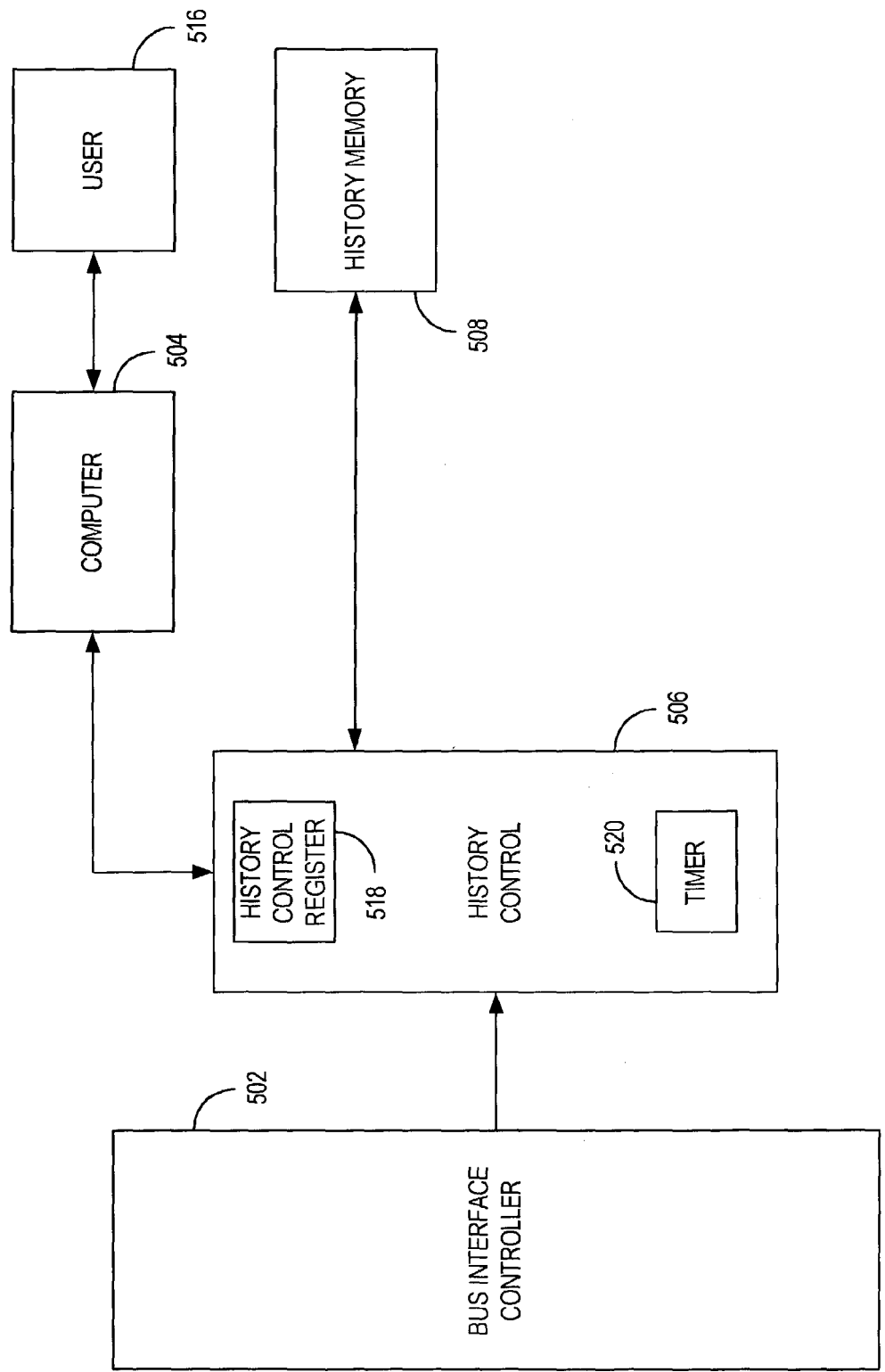
FIG. 5 illustrates a block diagram of a history trace apparatus according to the present invention.

FIG. 5 illustrates an exemplary block diagram of a history trace apparatus according to the principles of the present invention. User 516, operating at Computer 504, or other I/O device, is interconnected to History Control 506. History Control 506 operates to facilitate history trace operations, such that Bus Interface transactions occurring at Bus Interface Controller 502 may be captured and stored for later analysis by History Memory 508.

User 516, having access to a multitude of maintenance functions, or scripts, executable by Computer 504, is able to configure History Control Register 518 according a particular trace history requirement. In other words, User 516 may, through the use of Computer 504, program the operation of History Control Register 518 to setup trace history capture mode parameters such as: start record trigger events, stop record trigger events, and trace data format requirements. Further, once the trace history has been captured, User 516 may initiate a trace history data read from History Memory 508 in order to post analyze the trace history data.

Bus Interface Controller 502, as discussed above, operates in one of Arbitration, Request, Snoop, Response, or Data phases. History Control Register 518, through proper configuration by User 516 via Computer 504, allows capture of specific data for each of the phases in response to a maskable history trace. Once a transaction occurring on Bus Interface Controller 502 meets the maskable history trace configuration within History Control Register 518 as programmed by User 516, data relating to the transaction is latched into History Memory 508 for later retrieval. User 516 may access trace history data stored in History Memory 508 by causing a dynamic scan of History Control Register 518 to place it in read mode, whereby trace data may be read from History Memory 508, through History Control Register 518 and ultimately into a storage facility (not shown) within Computer 504.

One implementation of History Memory 508 uses a 128 bit wide×512 word deep RAM, capable of capturing up to 512, 128 bit data words. The various capture modes used to capture data in History Memory 508 are user selectable via Computer 504, where the occurrence of the selected capture mode event causes history data to be stored into History Memory 508. The nature of the history data captured by History Memory 508 is also user selectable via Computer 504. In one embodiment, up to 64 capture modes, selectable by 6 capture mode control bits, may be used to capture Bus Interface Controller 502 history. In addition, up to 8 data format modes, selectable by 3 data format mode bits, may be used to configure the type of data captured by History Memory 508. One example of a particular capture mode, Mode 1, captures Bus Interface Controller history whenever the processor initiates a Request A on the Bus Interface. The mode event in this instance, for example, is bus Request A initiated by one of processors 202 on Front Side Bus 212 of FIG. 2. It should be noted that any number of capture modes and data format modes may be obtainable by simply extending the bit weight of each mode within History Control Register 518.

Figure 6:
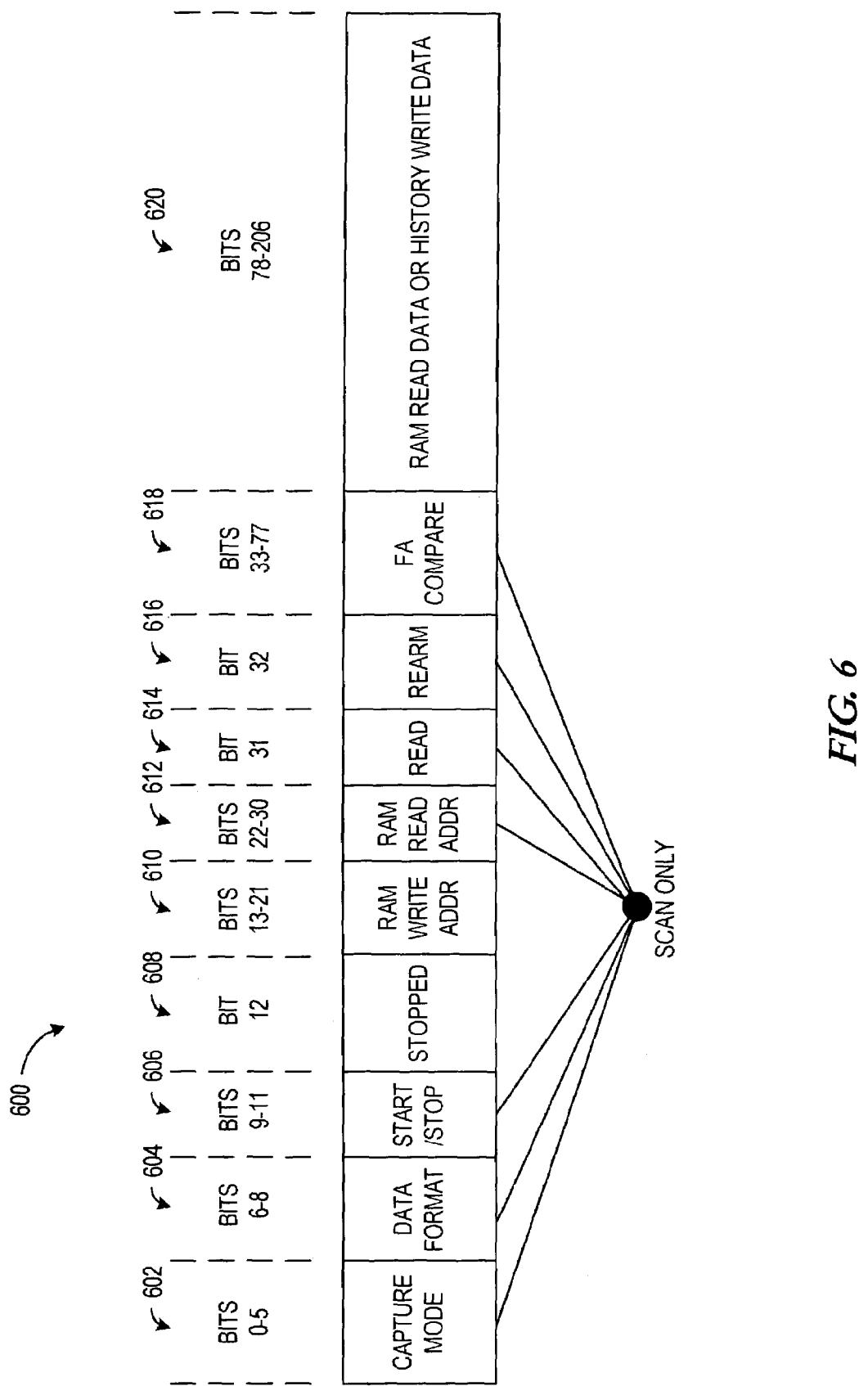
FIG. 6 illustrates an exemplary history control register used in the history trace apparatus of FIG. 5.

History Control Register 518, in one embodiment according to the present invention, is a dynamic scan register, where the scan only bits associated with the scan register are written only when History Control Register 518 is dynamically scanned. FIG. 6 illustrates one example of History Control Register 600 and associated control bits. Capture Mode bits 602 may be configured at scan to determine the mode event of interest. Table 1 illustrates some exemplary capture modes according to the present invention.

TABLE 1

| Capture Mode Control Word | Capture Mode |
| --- | --- |
| 000000 | Capture at every bus clock cycle |
| 000001 | Capture on Request A |
| 000010 | Capture on Request B |
| 000100 | Capture on Snoop |
| 001000 | Capture on Response |
| 010000 | Capture on Data |
| 100000 | Capture on Deferred Phase |

Capture Mode Control "000000" corresponds to a capture mode that captures data at every bus clock cycle. Capture Modes "000001" and "000010" refer to the request phase of Bus Interface Controller 502, Capture Mode "000100" refers to the snoop phase of Bus Interface Controller 502, Capture Mode "001000" refers to the response phase of Bus Interface Controller 502, Capture Mode "010000" refers to the data phase of Bus Interface Controller 502, and Capture Mode "1000000" refers to a deferred response phase of Bus Interface Controller 502. All permutations of the Capture Mode Control bits are allowable, which in this example, allows 64 possible permutations of trace mode control.

Data Format Mode bits 604 of History Control Register 600 are scanned to control the data format of each 128 bit data word that is captured by History Memory 508. Each of the eight Data Format Modes that can be configured by Data Format Bits 604 defines the meaning of each bit position within each 128-bit word that is captured within History Memory 508. Given that a 3 bit field is provided with which to select the desired data format mode, a total of 8 different data format modes may be selected for this embodiment. For example, data format modes that may be selected in accordance with the present invention include bus signals 1, bus signals 2, Outgoing Queue information, Buffer Tracker information, and I/O capture information. It should be noted that the type of data information gathered for any given data format mode is a design choice and may include many thousands of different combinations depending upon the specific application.

Bus signals 1, for example, may include Bus Interface information dealing with address fields where the address fields are shared for bus A and bus B signals, request fields where the request fields are also shared between bus A and bus B signals, snoop fields, response fields, In-Order Queue pointers and other miscellaneous Bus Interface signals. Bus signals 2, contains a concatenated set of the data fields for bus signals 1. For instance, parts of the address and request A and parts of the address and request B fields are included, along with some snoop, response, and pointer information. In general, the specific data format mode selected may be optimized for the specific capture mode selected according to Table 1. For example, the Bus Signals 1 data format mode is optimized for use with Capture Mode Control Word "111111", which activates all capture modes. Alternatively, the Bus Signals 2 data format is optimized for use with the "000001", "000100", or "001000" mode control words, which represent the Request A, Snoop, and Response capture modes, respectively. The Bus Signals 2 data format represents a condensation of varying bus phases into one capture history, which allows an increased amount of data to be captured as compared to, for example, the Bus Signals 1 data format.

Start/Stop bits 606 of History Control Register 600 are scanned to control the commencement and cessation of recording. Table 2 lists the possible combinations of the Start/Stop control word according to one embodiment of the present invention. Most of the recording options provide an immediate recording option, where the stop recording triggering event may be for varying reasons such as when a stop recording command is received, a Bus Interface error occurs or when History Memory 508 is full. Some other recording options, on the other hand, offer a start recording triggering event such as when Function/Address Compare field 618 of History Control Register 600 is matched on the Bus Interface or when a Bus Interface error occurs, both of which may be stopped when History Memory 508 is full. Stopped field 608 indicates that the recording session has ended due to a stop recording triggering event. Timer 520 of FIG. 5 keeps track of the amount of time elapsed from the start of a history trace to the end of a history trace and may provide the elapsed time data to History Memory 508 for each record event, depending upon whether or not the elapsed time field is required for the particular data format modes being utilized.

TABLE 2

| Start/Stop | Action |
|---|---|
| 000 | Start recording immediately, stop when History Memory 508 of FIG. 5 is full |
| 001 | Start recording immediately, stop when a Bus Interface critical or passive error is detected |
| 010 | Start recording immediately, stop when a stop command is received from Computer 504 of FIG. 5 |
| 011 | Start recording immediately, stop when a stop command is received from the Bus Interface |
| 100 | Start recording immediately, stop when a function/address is received from the Bus Interface that matches the function/address previously loaded into FA Compare bit field 618 of FIG. 6 |
| 101 | Start recording when an FA Compare is detected, stop when the History Memory 508 of FIG. 5 is full |
| 110 | Start recording when a Bus Interface critical or passive error occurs and stop when History Memory 508 of FIG. 5 is full |
| 111 | Start recording immediately, stop only when the Bus Interface clock is stopped (free run) |

Fields 610 and 612 of History Control Register 600 contain an 8 bit pointer into History Memory 508 of FIG. 5. Field 610 contains a pointer to one of 512 memory locations contained within History Memory 508 and indicates the last valid data location plus one within History Memory 508 when History Control Register 600 is scanned out. Field 612 of History Control Register 600 contains a pointer to one of 512 memory locations contained within History Memory 508, indicating the memory location to be accessed when History Memory 508 read mode is active. A new read address is to be scanned into Field 612 for each History Memory 508 read that is required.

Read field 614 of History Control Register 600 is a dynamic scan bit that either sets or clears History Read mode. History Read mode allows the contents of History Memory 508 to be accessed and loaded into Ram Read Data field 620 of History Control Register 600 for subsequent upload to Computer 504 of FIG. 5, where post-record analysis can be performed on the recorded data. Once Read field 614 has been set, recording of Bus Interface data is disabled until such time that a dynamic scan of History Control Register 600 clears Read field 614.

Rearm field 616 is a dynamic scan bit that allows a reset of the history environment in preparation for a history capture session. Setting the Rearm bit causes History Control 506 to prepare for a new history capture session by: 1.) resetting the write address to History Memory 508; 2.) clearing any stop condition, which may be indicated by Stopped bit 608 of History Control Register 600; 3.) clearing any start condition that may have been set by Start/Stop field 606 of History Control Register 600; and 4.) resetting the elapsed time counter contained within Timer 520 of FIG. 5. Once the reset activity caused by setting Rearm field 616 has finished, the Rearm field will have no further effect until it is once again dynamically scanned in.

FA Compare field 618 contains function/address information, such that when Start/Stop field 606 is set to either "100" or "101", determines when the history trace function is either stopped or started, respectively. In other words, User 516 may, for example, cause a dynamic scan of History Control Register 518 to set Start/Stop field 618 to "101". User 516 may also, for example, dynamically scan in a function address of interest into FA Compare field 618. Once an address appearing on Bus Interface Controller 502 of FIG. 5 matches the address scanned into FA Compare field 618, an event trigger is issued, which causes data defined by Data Format field 604 to be written to History Memory 508 of FIG. 5. Subsequent address matches will likewise cause data to be written to History Memory 508 until it reaches capacity or until a stop command is received.

Field 620 of History Control Register 600 provides either read data from History Memory 508 of FIG. 5 or write data to History Memory 508. Field 620 provides read data from History Memory 508 to Computer 504 when History Read mode is set by bit 614 of History Control Register 600. Alternately, Field 620 provides write data from Bus Interface Controller 502 to History Memory 508 when bit 614 is reset and a proper trace history triggering event has occurred.

Figure 7:
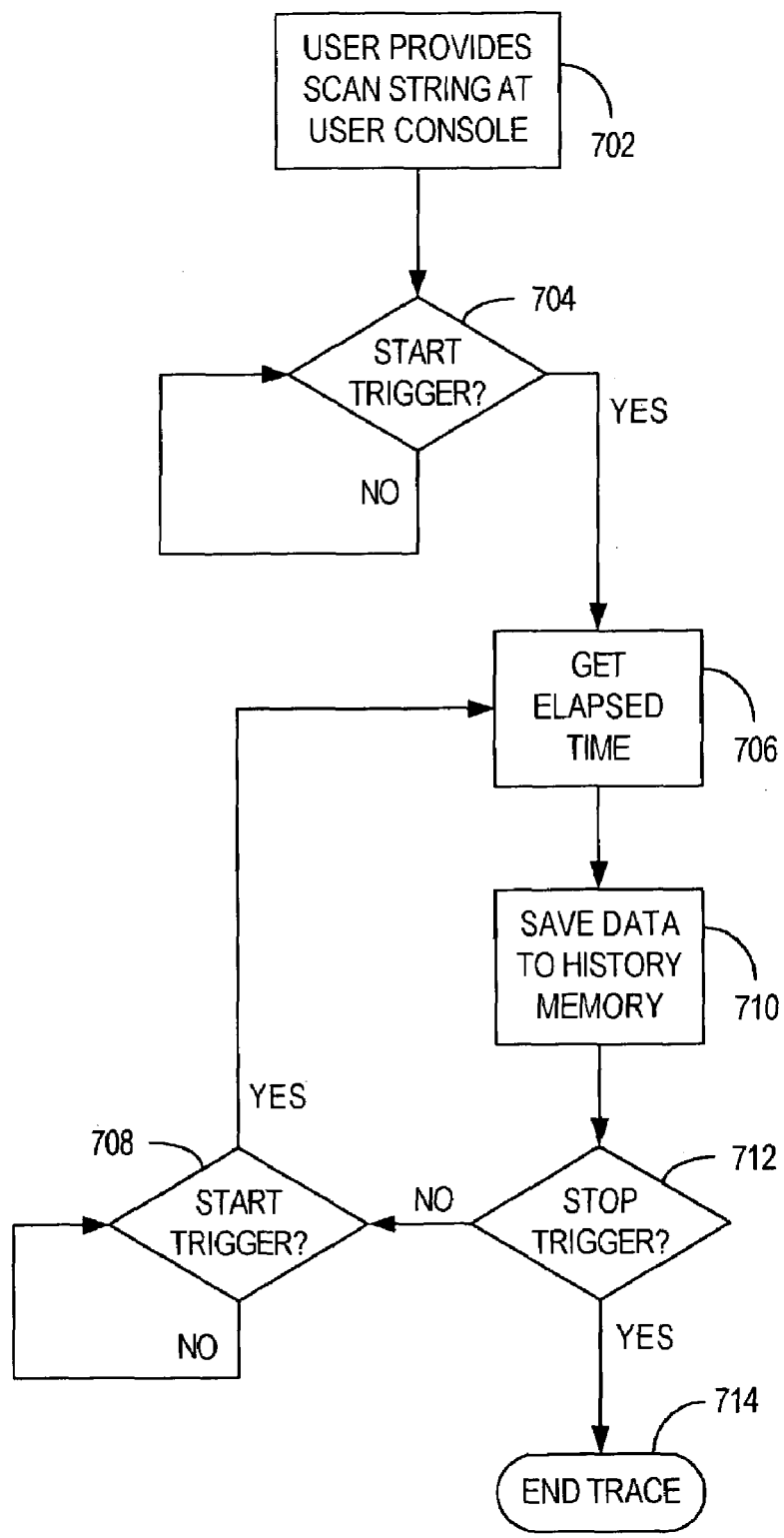
FIG. 7 illustrates a flow chart depicting typical write mode history trace operation according to the present invention.

FIG. 7 illustrates an exemplary flow diagram of write mode operation of the history trace apparatus as depicted in FIG. 6. In preparation for gathering a trace history, a user defines a dynamic scan string via a system console, laptop computer, or any other suitable I/O device in step 702. The dynamic scan string is effective to define the scan only bits of History Control Register 600 as illustrated in FIG. 6. Once write mode has been established, the history trace may either commence immediately or History Control 506 of FIG. 5 continuously monitors Bus Interface Controller of FIG. 5 for Bus Interface errors or a match between an address appearing at Bus Interface Controller 502 that matches FA Compare field 618 of FIG. 6, as illustrated in step 704.

Once the history trace is triggered, an elapsed time is retrieved at step 706 along with the customized data report as defined by Data Format field 604 of FIG. 6 and both are written to History Memory 508 of FIG. 5. If a stop trigger has not been received at step 712, either by command or by capacity limits set by History Memory 508 of FIG. 5, then another start trigger is queried in step 708 exactly as in step 704. Once the stop trigger has been received, history trace write mode commences at step 714. User 516 of FIG. 5 is then able to retrieve the history trace saved into History Memory 508 by first setting the scan string at Computer 504 such that read mode is established for History Control Register 518 of FIG. 5. Once read mode is established, data may be transferred from History Memory 508 through History Control Register 518 into Computer 504 for post analysis.

In conclusion, an apparatus and method have been provided to facilitate a mechanism that allows a trace of system bus transactions to be stored for later retrieval and troubleshooting. Further, an apparatus and method have been provided which allows a customization of the system bus trace such that error dependencies based on address, data or function may be easily determined and which allows a customization of the data format saved as a result of the system bus trace.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of recording bus activity, comprising:
    configuring a first data value in a first position in a dynamic scan register to define one of a plurality of user-selectable a capture modes in response to scanned user input of the first data value, each capture mode specifying at least one phase of a Plurality of phases of bus activity;
    configuring a second data value in a second position in the dynamic scan register to define one of a plurality of user-selectable data formats in response to scanned user input of the second data value, each data format specifying a different set of data of bus activity to collect;
    collecting data of bus activity in response to bus activity that matches the capture mode responsive to the first data value in the first position in the dynamic scan register; and
    storing the data of the bus activity in accordance with the data format responsive to the second data value in the second position in the dynamic scan register.

2. The method according to claim 1, wherein configuring the dynamic scan register comprises using an I/O device to program the dynamic scan register.

3. The method according to claim 2, wherein the I/O device is a computer.

4. The method according to claim 3, wherein bit positions within the dynamic scan register are modified by a user operating the computer.

5. The method according to claim 1, wherein the data format is defined to be optimized to the capture mode.

6. The method according to claim 1, further comprising:
    configuring the dynamic scan register to define one of a plurality of start events and one of a plurality of stop events; and
    wherein collecting data of bus activity includes commencing monitoring of data of bus activity in response to detecting occurrence of the start event.

7. The method according to claim 6, wherein the stop event is the memory storage unit being full, and collecting bus activity further comprises stopping monitoring in response to filling the memory storage unit.

8. The method according to claim 6, wherein the stop event is receipt of a stop command, and collecting bus activity further comprises stopping monitoring activity in response to receiving a stop command in the dynamic scan register.

9. The method according to claim 1, wherein storing data comprises saving the data of bus activity into a memory storage unit.

10. A circuit arrangement for recording bus activity, comprising:
    a bus interface;
    a user-scannable history control register including a capture mode control field and a data format control field, wherein a data value in the capture mode control field specifies one of a plurality of user-selectable capture modes and each capture mode specifies at least one phase of a plurality of phases of bus activity, and a data value in the data format control field specifies one of a Plurality of user-selectable data formats and each data format specifies a different set of data of bus activity to record;
    a history memory; and
    a history control circuit coupled to the bus interface, to the control register, and to the history memory, wherein the history control circuit selectively records in the history memory, in response to detecting a match of a current bus Phase to the capture mode specified by the data value in the capture mode control field in the history control register, data of bus activity received by the bus interface in accordance with the data format specified by the data value in the data format control field in the dynamic scan register.

11. The circuit arrangement according to claim 10, further comprising an I/O device coupled to the history control register.

12. The circuit arrangement according to claim 11, wherein the I/O device includes a computer, wherein a user at the computer configures the history control register.

13. The circuit arrangement according to claim 10, wherein the scannable history control register further comprises
a trigger-event control field that controls commencement and cessation of recording of data to the history memory.

14. The circuit arrangement according to claim 13, wherein the data format control field allows selection of a data format of interest after commencing and prior to ceasing recording of data to the history memory.

15. A multiprocessing system, comprising:
a plurality of multiprocessors sharing a common system bus;
a node controller coupled to each of the plurality of multiprocessors, the node controller comprising:
a bus interface controller coupled to the common system bus;
a trace circuit arrangement comprising:
a user-scannable history control register including a capture mode control field and a data format control field, wherein a data value in the capture mode control field specifies one of a plurality of user-selectable capture modes and each capture mode specifies at least one phase of a plurality of phases of bus activity, and a data value in the data format control field specifies one of a plurality of user-selectable data formats and each data format specifies a different set of data of bus activity to record;
a history memory;
a history control circuit coupled to the bus interface controller, coupled to the history control register, and coupled to the history memory, wherein the history control circuit records in the history memory, in response to detecting a match of a current bus phase to the capture mode specified by the data value in the capture mode control field in the history control register, data of bus activity received by the bus interface in accordance with the data format specified by the data value in the data format control field in the dynamic scan register.

16. The multiprocessing system according to claim 15, further comprising an I/O device coupled to the history control register.

17. The multiprocessing system according to claim 16, wherein the I/O device includes a computer, wherein a user at the computer configures the history control register.

18. The multiprocessing system according to claim 15, wherein the history control register further comprises
a trigger-event control field that controls commencement and cessation of recording of data to the history memory.

19. The multiprocessing system according to claim 18, wherein the data format control field allows selection of a data format of interest after commencing and prior to ceasing recording of data to the history memory.

20. The multiprocessing system according to claim 18, wherein the trigger-event control field controls the commencement and cessation of recording of data to the history memory.

21. A data processing system, comprising:
a system bus;
a memory arrangement coupled to the system bus;
a plurality of processors coupled to the system bus;
a node controller coupled to each of the processors, the node controller including,
a bus interface controller coupled to the system bus;
a history memory;
a user-scannable history control register including a capture mode control field, a data format control field, a read-write control field, and a read-write data field, wherein a data value in the capture mode control field specifies one of a plurality of user-selectable capture modes and each capture mode specifies at least one of capture at every bus clock cycle, capture in a request phase, capture in a snoop phase, and capture in a data phase, and a data value in the data format control field specifies one of a plurality of user-selectable data formats and each data format specifies a different set of bus activity data to record;
a history control circuit coupled to the bus interface controller, coupled to the history control register, and coupled to the history memory, wherein the history control circuit selects and records in the history memory, in response to a match of a current bus phase to the capture mode specified by the data value in the capture mode control field in the history control register, a set of bus activity data responsive to the data value in the data format control field in the dynamic scan register, wherein responsive to a first state of the read-write control field the history control circuit reads data from the history memory into the read-write data field of the history control register and responsive to a second state of the read-write control field writes data from the read-write data field into the history memory.

22. The system of claim 21, wherein the history control register includes a start-stop control field and a function-address comparison field, wherein a data value in the start-stop control field specifies one combination of a plurality of events that control commencement and cessation of recording of data of bus activity data, a data value in the function-address control field specifies a function and a memory address, and the history control circuit is further configured to start recording bus activity data responsive to a first data value in the start-stop control field and responsive to a match of data in the function-address control field to data provided by the bus interface controller.

23. The system of claim 22, wherein the history control circuit is further configured to immediately commence recording bus activity data responsive to a second data value in the start-stop control field.

24. The system of claim 22, wherein the history control circuit is further configured to track time elapsed from commencement of recording to cessation of recording and record data indicative of the time elapsed to the history memory for each recorded set of bus activity data.

25. The system of claim 24, wherein the history control circuit is further configured to record the data indicative of the time elapsed to the history memory responsive to a first value in the data format control field, and not record the data indicative of the time elapsed to the history memory responsive to a second value in the data format control field.

* * * * *